(12) United States Patent
Eskicioglu et al.

(10) Patent No.: US 8,718,652 B2
(45) Date of Patent: May 6, 2014

(54) METHOD FOR ASSOCIATING A CLUSTER OF PREMIER FEMTOCELLS WITH USER EQUIPMENT

(75) Inventors: Suat Eskicioglu, Ottawa (CA); Cristian Demetrescu, Maidenhead (GB)

(73) Assignee: Alcatel Lucent, Paris (FR)

( * ) Notice: Subject to any disclaimer, the term of this patent is extended or adjusted under 35 U.S.C. 154(b) by 963 days.

(21) Appl. No.: 12/265,173

(22) Filed: Nov. 5, 2008

(65) Prior Publication Data

US 2010/0112999 A1 May 6, 2010

(51) Int. Cl.
*H04W 36/00* (2009.01)
*H04W 40/00* (2009.01)

(52) U.S. Cl.
USPC .......................................... 455/444; 455/446

(58) Field of Classification Search
None
See application file for complete search history.

(56) References Cited

U.S. PATENT DOCUMENTS

| | | | |
|---|---|---|---|
| 5,396,647 A | | 3/1995 | Thompson et al. ............ 455/33.2 |
| 2006/0034204 A1* | | 2/2006 | Lee et al. ....................... 370/312 |
| 2008/0132239 A1* | | 6/2008 | Khetawat et al. .............. 455/438 |
| 2008/0267153 A1* | | 10/2008 | Mukherjee et al. ............. 370/338 |
| 2009/0325583 A1* | | 12/2009 | Burgess et al. ................ 455/444 |

FOREIGN PATENT DOCUMENTS

WO    WO 00/35203 A    6/2000

OTHER PUBLICATIONS

International Search Report PCT/IB2009/055209 dated Mar. 2, 2010.
"3GPP TS 25.467 VO.0,1 (Sep. 2008) $3^{rd}$ Generation Partnership Project; Technical Specification Group Radio Access Network; UTRAN architecture for 3G Home NodeB; Stage 2 (Release 8) "[On-Line] Oct. 31, 2008, pp. 1-10.
NTT Docomo el al., "Text proposal capturing agreements on RRC connection reject handling and T302, T303, T305" 3GPP Draft; R2-084846 RRC Reject Handling, $3^{rd}$ Generation Partnership Project (3GPP) Mobile Competence Centre; 650, Route Des Lucioles; F-06921 Sophia-Antipolis Cedex; France, No. Jeju; Aug. 8, 2008 pp. 2, Figure 5.3.3.1-2; p. 6, lines 13-21.

* cited by examiner

*Primary Examiner* — Ariel Balaoing
*Assistant Examiner* — Christopher Kohlman
(74) *Attorney, Agent, or Firm* — Davison & Sheehan LLP (57) ABSTRACT

The present invention provides a method for implementation in user equipment that is configured to communicate with a wireless communication system that includes a macro-cell and a plurality of femtocells that are deployed in a cluster. The method includes providing a call connection request from the user equipment to one of a subset of the plurality of femtocells and receiving information identifying the subset of the femtocells as a femtocell cluster associated with the user equipment. The method also includes receiving information indicating locations of each of the femtocells in the femtocell cluster. The method further includes storing the information identifying the femtocells in the femtocell cluster and the information indicating the locations in the user equipment.

19 Claims, 4 Drawing Sheets

METHOD FOR ASSOCIATING A CLUSTER OF PREMIER FEMTOCELLS WITH USER EQUIPMENT

CROSS REFERENCE TO RELATED APPLICATIONS

This application is related to U.S. patent application Ser. No. 12/265,089, filed on Nov. 5, 2008, entitled "LOCATION-BASED HANDOVERS FROM A MACROCELL TO A FEMTOCELL USING EVENT-TRIGGERED MEASUREMENT REPORT" inventors CRISTIAN DEMETRESCU and SUAT ESKICIOGLU.

This application is related to U.S. patent application, filed on 12/265,136, entitled "LOCATION-BASED HANDOVERS FROM A MACROCELL TO A FEMTOCELL USING PERIODIC MEASUREMENT REPORTING" inventors CRISTIAN DEMETRESCU and SUAT ESKICIOGLU.

This application is related to U.S. patent application Ser. No. 12/265,215, filed on Nov. 5, 2008, entitled "METHOD FOR ASSOCIATING A PREMIER FEMTOCELL WITH USER EQUIPMENT" inventors CRISTIAN DEMETRESCU and SUAT ESKICIOGLU.

BACKGROUND OF THE INVENTION

1. Field of the Invention

This invention relates generally to communication systems, and, more particularly, to wireless communication systems.

2. Description of the Related Art

Conventional wireless communication systems use a network of base stations to provide wireless connectivity to one or more mobile units. In some cases, the mobile units may initiate wireless communication with one or more base stations in the network, e.g., when the user of the mobile unit would like to initiate a voice or data call. Alternatively, the network may initiate the wireless communication link with the mobile unit. For example, in conventional hierarchical wireless communications, a server transmits voice and/or data destined for a target mobile unit to a central element such as such as a Radio Network Controller (RNC). The RNC may then transmit paging messages to the target mobile unit via one or more base stations or node-Bs. The target mobile unit may establish a wireless link to one or more of the base stations in response to receiving the page from the wireless communication system. A radio resource management function within the RNC receives the voice and/or data and coordinates the radio and time resources used by the set of base stations to transmit the information to the target mobile unit. The radio resource management function can perform fine grain control to allocate and release resources for broadcast transmission over a set of base stations.

A conventional base station provides wireless connectivity within a geographical region that is referred to as a cell or a macrocell or a sector. Conventional base stations can transmit signals using a predetermined amount of available transmission power, which in some cases is approximately 35 W for a base station. The range of the macrocell is determined by numerous factors including the available transmission power, angular distribution of the available power, obstructions within the macrocell, environmental conditions, and the like. For example, the range of a macrocell can vary from as little as 300 m in a densely populated urban environment to as much as 10 km in a sparsely populated rural environment. The coverage area can also vary in time if any of these parameters changes.

One alternative to the conventional hierarchical network architecture is a distributed architecture including a network of access points, such as base station routers, that implement distributed communication network functionality. For example, each base station router may combine RNC and/or PDSN functions in a single entity that manages radio links between one or more mobile units and an outside network, such as the Internet. Base station routers wholly encapsulate the cellular access technology and may proxy functionality that utilizes core network element support to equivalent IP functions. For example, IP anchoring in a UMTS base station router may be offered through a Mobile IP Home Agent (HA) and the GGSN anchoring functions that the base station router proxies by through equivalent Mobile IP signaling. Compared to hierarchical networks, distributed architectures have the potential to reduce the cost and/or complexity of deploying the network, as well as the cost and/or complexity of adding additional wireless access points, e.g. base station routers, to expand the coverage of an existing network. Distributed networks may also reduce (relative to hierarchical networks) the delays experienced by users because packet queuing delays at the separate RNC and PDSN entities in hierarchical networks may be reduced or removed.

At least in part because of the reduced cost and complexity of deploying a base station router, base station routers may be deployed in locations that are impractical for conventional base stations. For example, a cluster of base station routers may be deployed in a commercial building to provide wireless connectivity to people working in the building. Base station routers deployed in a commercial location (and the areas served by these base station routers) are typically referred to as femtocells because they are intended to provide wireless connectivity to a much smaller area that encompasses the building or a portion of the building. Femtocells have a much smaller power output than conventional base stations that are used to provide coverage to macrocells. For example, a typical femtocell has a transmission power on the order of 10 mW. Consequently, the range of a typical femtocell is much smaller than the range of a macrocell. For example, a typical range of a femtocell is about 100 m.

Femtocells are expected to be deployed in conjunction with a macro-cellular network in an overlay configuration. For example, a macro-cellular network may be used to provide wireless connectivity to a district that includes numerous commercial buildings. Any mobile unit traveling through the district or located in one of the buildings can access the wireless communication system using the macro-cellular network. Clusters of femtocells can also be deployed in one or more of the buildings to provide overlay coverage within (or near) the building. Consequently, there will be a one-to-many relationship between the macrocells and the femtocells within the coverage area of the femtocell cluster. However, user equipment will typically only be able to camp on the femtocells in the cluster when the user is an employee of the company that installed the femtocell cluster or other authorized person.

User equipment or mobile units therefore need to verify that they are authorized to access femtocells in the cluster before handing off from the macro-cellular network. For example, when a user arrives at work their mobile unit may be able to detect a macrocell and numerous femtocells in clusters associated with different companies in the same building or nearby buildings. However, the mobile unit is only authorized to camp on femtocells in one cluster and make circuitswitched calls or initiate packet-switched sessions via the femtocells in the cluster. The conventional practice is to drop any active calls and then determine the correct femtocell while the mobile unit is in idle mode, e.g. by trial and error. For example, user equipment may attempt to camp on each available femtocell until it detects a cluster femtocell that allows it to camp. Since the user equipment may not have any information that can guide the selection of candidate femtocells in the correct clusters, this brute force technique can consume significant overhead and degrade the user's quality of experience. Another conventional practice is to utilize trial and error methodology to identify the handover target femtocell. For example, the RNC can try to handover the session to one femtocell in the cluster and when the handover attempt is rejected, it re-tries with another femtocell until the femtocell that accepts this user equipment is determined. Since there is no association between the scrambling codes of the femtocells in the cluster and the user equipment in the conventional approach, the RNC does not know where the user equipment should move to and therefore may attempt many macrocell to femtocell handovers to attempt to find a femtocell in the correct cluster. This not only creates a huge signaling overhead on the radio and infrastructure that increases the interference level and reduces the network capacity, but also degrades end user's quality of experience.

SUMMARY OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for implementation in user equipment that is configured to communicate with a wireless communication system that includes a macro-cell and a plurality of femtocells. The method includes providing a call connection request from the user equipment to one of a subset of the plurality of femtocells and receiving information identifying the subset of the femtocells as a femtocell cluster associated with the user equipment. The method also includes receiving information indicating locations of each of the femtocells in the femtocell cluster. The method further includes storing the information identifying the femtocells in the femtocell cluster and the information indicating the locations in the user equipment.

In another embodiment, a method is provided for implementation in a first femtocell that is configured for deployment as a femtocell cluster in a wireless communication system that includes a macro-cell. The first femtocell is one of a plurality of femtocells in the cluster that is deployed in the wireless communication system. The method includes receiving, at the first femtocell, a call connection request from user equipment and providing information identifying a subset of the plurality of femtocells as a femtocell cluster associated with the user equipment. The method further includes providing information indicating locations of each of the femtocells in the femtocell cluster. The first femtocell is one of the subset of the plurality of femtocells.

In yet another embodiment, a method is provided for implementation in a radio network controller configured for deployment in a wireless communication system that includes a macro-cell and a plurality of femtocells. The method includes receiving, at the radio network controller, a call connection request from user equipment configured to communicate with a femtocell cluster formed of a subset of the plurality of femtocells. The method also includes providing a call connection set up message and receiving information identifying the subset of femtocells in the femtocell cluster associated with the user equipment. The method further includes receiving information indicating one or more frequencies used for transmission between the user equipment and the femtocells in the femtocell cluster. The method further includes storing the information identifying the subset of femtocells in the femtocell cluster associated with the user equipment and the frequency(ies) used for transmission between the user equipment and the femtocells in the femtocell cluster.

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
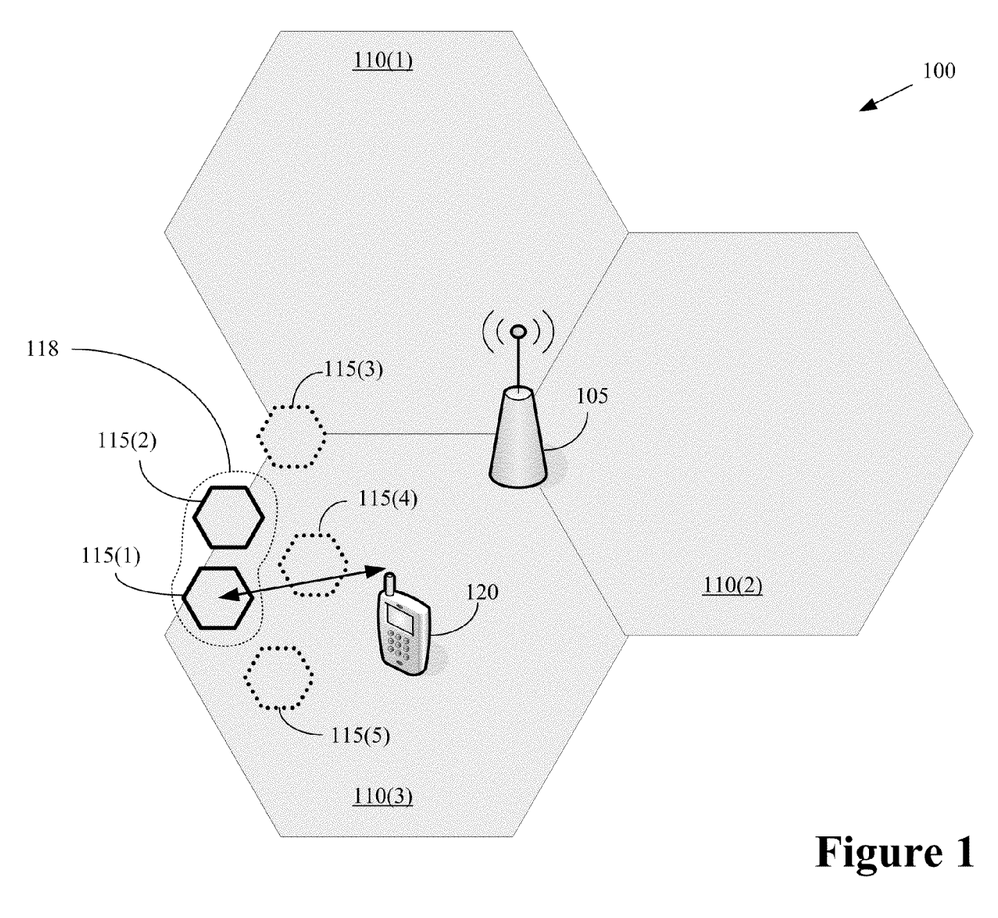
FIG. 1 conceptually illustrates a first exemplary embodiment of a wireless communication system.

FIG. 1 conceptually illustrates a first exemplary embodiment of a wireless communication system 100. In the illustrated embodiment, a base station 105 provides wireless connectivity to a plurality of macro-cells 110(1-3). Although the indices (1-3) can be used to identify individual macro cells 110(1) or subsets thereof, these indices may be dropped when referring collectively to the macro-cells 110. This convention may be applied to other elements depicted in the drawings and referred to using an identifying numeral and one or more distinguishing indices. The macro-cells 110 shown in FIG. 1 correspond to different sectors associated with the base station 105. For example, the base station 105 may include three antennas (or three groups of antennas) that provide wireless connectivity to three sectors associated with the three macro-cells 110. However, persons of ordinary skill in the art having benefit of the present disclosure should appreciate that alternative embodiments may use a different base station 105 to provide wireless connectivity to each macro-cell 110. Moreover, the wireless communication system 100 may include any number of macro-cells 110 and/or base stations 105.

The wireless communication system 100 also includes an overlay network of femtocells 115. For example, the femtocells 115 may be installed in commercial buildings for registered users such as employees, clients, authorized visitors, and the like. Although five femtocells 115 are depicted in FIG. 1, persons of ordinary skill in the art having benefit of the present disclosure should appreciate that the wireless communication system 100 may include any number of femtocells 115 distributed throughout the wireless communication system 100. In the illustrated embodiment, the femtocells 115(1-2) are installed in a particular commercial building by an organization for the use of the organization's employees, clients, and/or other authorized users. The femtocells 115(1-2) are therefore grouped into a femtocell cluster 118 that can be configured to provide service to the user equipment 120 owned and/or operated by the organization's employees, clients, and/or other authorized users.

In order to access the femtocell cluster 118, the user equipment 120 may be associated with the femtocell cluster 118 and may be configured to receive and store information indicative of the femtocell cluster 118 and/or the femtocells 115(1-2) in the cluster 118. In the illustrated embodiment, either of the femtocells 115(1-2) can provide the configuration information to the user equipment 120. For example, the user equipment 120 and/or the femtocells 115(1-2) may be in a configuration mode, e.g., as a result of user input and/or as a result of the femtocells 115(1-2) and/or the user equipment 120 determining that the user equipment 120 is authorized to access the femtocell cluster 118 but is not currently registered with the femtocell cluster 118. When either of the femtocells 115(1-2) receives the call connection request, the femtocell 115(1-2) may send the user equipment 120 a message including information indicating its location and indicating that it is in the femtocell cluster 118. The femtocell 115(1-2) also transmits information identifying the other femtocells 115(1-2) in the femtocell cluster 118 and indicating the locations of the other femtocells 115(1-2). The user equipment 120 may then store the information identifying the femtocell cluster 118 and indicating the locations of the femtocells 115(1-2) so that this information can be used during future communications with the femtocell cluster 118.

Figure 2:
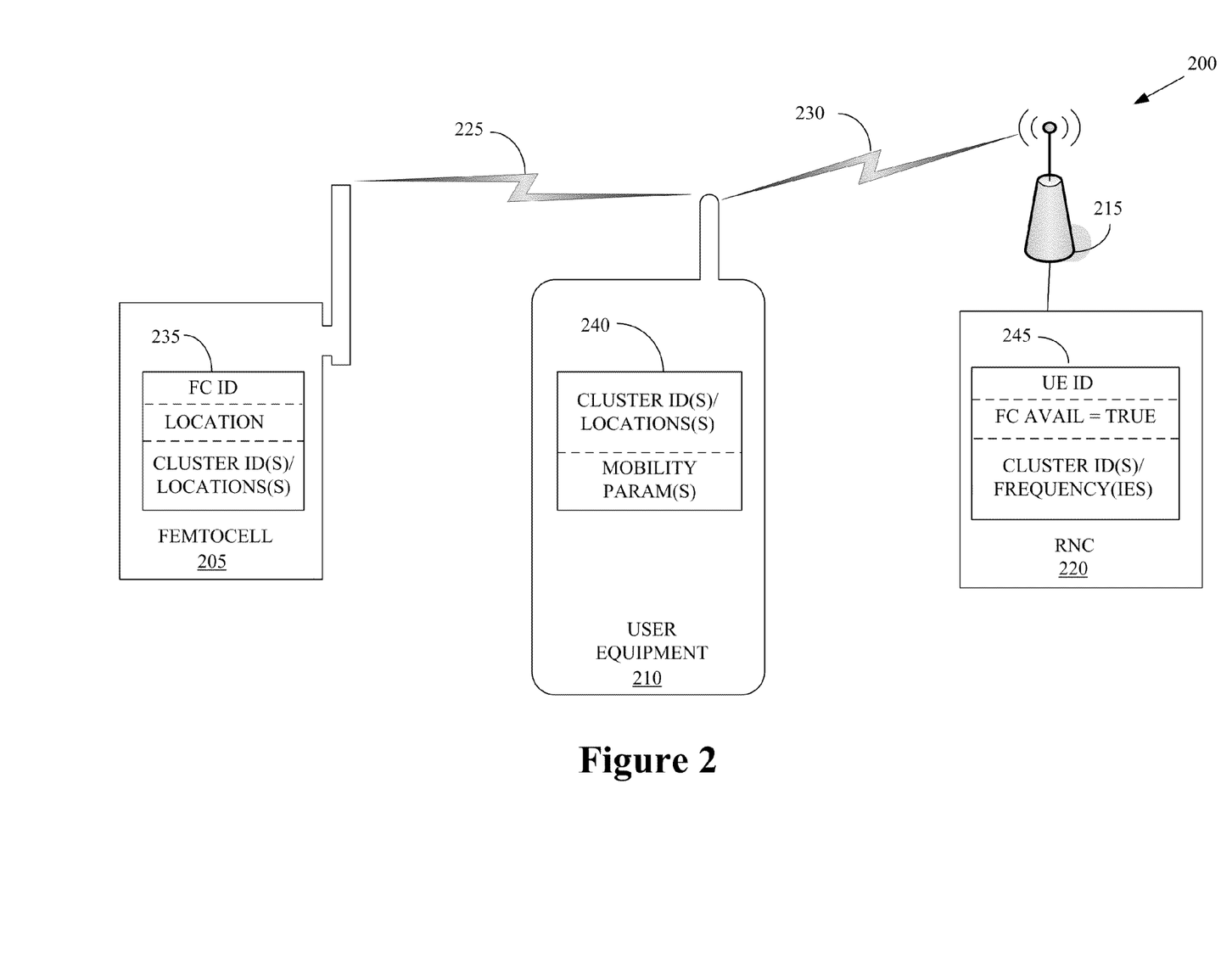
FIG. 2 conceptually illustrates a second exemplary embodiment of a wireless communication system.

FIG. 2 conceptually illustrates a second exemplary embodiment of a wireless communication system 200. In the illustrated embodiment, the wireless communication system 200 includes a femtocell 205, user equipment 210, a base station 215, and a radio network controller (RNC) 220. Persons of ordinary skill in the art having benefit of the present disclosure should appreciate that the wireless communication system 200 may include other elements that are not depicted in FIG. 2 to avoid unnecessarily obscuring the discussion. The femtocell 205 and the user equipment 210 can communicate over an air interface 225. The user equipment 210 and the base station 215 can communicate over another air interface 230. Persons of ordinary skill in the art having benefit of the present disclosure should appreciate that the air interfaces 225, 230 can be used concurrently and/or simultaneously but are not necessarily used concurrently and/or simultaneously. For example, the femtocell 205 and the user equipment 210 may communicate over the air interface 225 during a first time interval and then tear down the air interface 225. The user equipment 210 may then communicate with the base station 215 over the air interface 230 during a second time interval after tearing down the air interface 225.

The femtocell 205 is a member of a femtocell cluster associated with the user equipment 210. The femtocell cluster includes the femtocell 205 and one or more additional femtocells (not shown in FIG. 2). In the illustrated embodiment, the femtocell 205 stores information 235 including an identifier and information indicating the location of the femtocell 205. The femtocell 205 also stores information 235 that identifies the femtocell cluster, the other femtocells in the cluster, and the locations of the femtocells in the cluster. In different embodiments, the location information may be stored in different formats. For example, the location information may be stored as coordinates (e.g., latitude and longitude) of the individual femtocells or using the coordinates of one location within the femtocell cluster (e.g., a central location or the location of one of the femtocells) and offsets associated with the individual femtocells. The location information may be determined using numerous different techniques, including Global Positioning System (GPS) functionality incorporated into the femtocell 205 or manual configuration of the femtocell 205 by a user or a service provider. Accordingly, the user equipment 210 and the radio network controller 220 may be configured so that they recognize the femtocell 205 as a part of the femtocell cluster associated with the user equipments 210.

In response to receiving a call connection request from the user equipment 210 over the air interface 225, the femtocell 205 may transmit the information 235 (as well as any other information including location or mobility related information associated with the femtocell cluster) to the user equipment 210. In one embodiment, an optional parameter (Boolean), FemtoClusterAvailable, may be added to the RRC Connection Setup message. During RRC Connection establishment between the femtocell 205 and the user equipment 210, the femtocell 205 sets this parameter to TRUE. A conditional parameter FemtoClusterCellLocation may also be added to the RRC Connection Setup message. The condition of the presence of this parameter is that the flag FemtoClusterAvailable is TRUE. Additional conditional FemtoClusterCellLocation parameters may be added to the RRC Connection Setup message to convey the location information associated with other femtocells in the femtocell cluster. The condition of the presence of this parameter may also be that the flag FemtoClusterAvailable is TRUE.

The user equipment 210 may then store the identity of the femtocell 205, the location of the femtocell 205, the identities of the other femtocells in the femtocell cluster, the locations of the other femtocells in the femtocell cluster, and any other mobility parameters associated with the femtocell 205 and/or the femtocell cluster. Exemplary mobility parameters include, but are not limited to, primary scrambling codes (PSC), an international mobile subscriber identity, a UTRAN Radio Network Temporary Identifier (U-RNTI), and the like. In the illustrated embodiment, the user equipment 210 defines a local variable, e.g. a data structure 240, to store the femtocell cluster information relevant to mobility. In the illustrated embodiment, the user equipment 210 stores the current cell information (relevant to mobility) and the location information from the RRC Connection Setup message into the FemtoCluster local data structure 240 when the FemtoClusterAvailable Boolean is set to True. The user equipment 210 may not take any action (e.g., the user equipment 210 may not store any information or create a data structure) when the Boolean is set to FALSE or the parameter does not exist.

The user equipment 210 may also communicate the femtocell cluster information provided by the femtocell 205 to the radio network controller 220 via the macro-cell base station 215. In the illustrated embodiment, the user equipment 210 communicates femtocell cluster information to the radio network controller 220 during RRC connection establishment. For example, optional parameters such as a Boolean variable FemtoClusterAvailable and a frequency of the femtocell 205 can be added to the RRC Connection Setup Complete message. Additional optional parameters indicating the other femtocells in the femtocell cluster and the frequencies used by these femtocells can be added to the RRC Connection Setup Complete message. If the local value of FemtoClusterAvailable is set to TRUE, then the user equipment 210 informs the radio network controller 220 that the femtocell 205 and the other femtocells in the cluster are available by adding this information in the RRC Connection Setup Complete message. The user equipment 210 may also use the RRC Connection Setup Complete message to indicate the frequency (or frequencies) used by the femtocell cluster members.

The radio network controller 220 maintains a context database 245 to include contact information associated with the user equipment 210, as well as other user equipment served by macro-cells that are connected to the radio network controller 220. In the illustrated embodiment, the radio network controller 220 stores the information associated with the user equipment 210 and information indicating that the user equipment 210 is associated with a premier femtocell in the RRC context 245 for the user equipment 210. For example, the context 245 for the user equipment 210 may include an identifier, a Boolean variable indicating that the femtocell cluster is available, and one or more parameters indicating the frequency or frequencies used by the femtocells in the cluster. Once the context 245 for the user equipment 215 has been configured, the radio network controller 220 knows that the user equipment 210 is associated with a femtocell cluster. Although the user equipment 210 has been depicted as being associated with a single femtocell cluster, persons of ordinary skill in the art having benefit of the present disclosure should appreciate that in alternative embodiments the user equipment 210 may be associated with more than one femtocell cluster.

Figure 3:
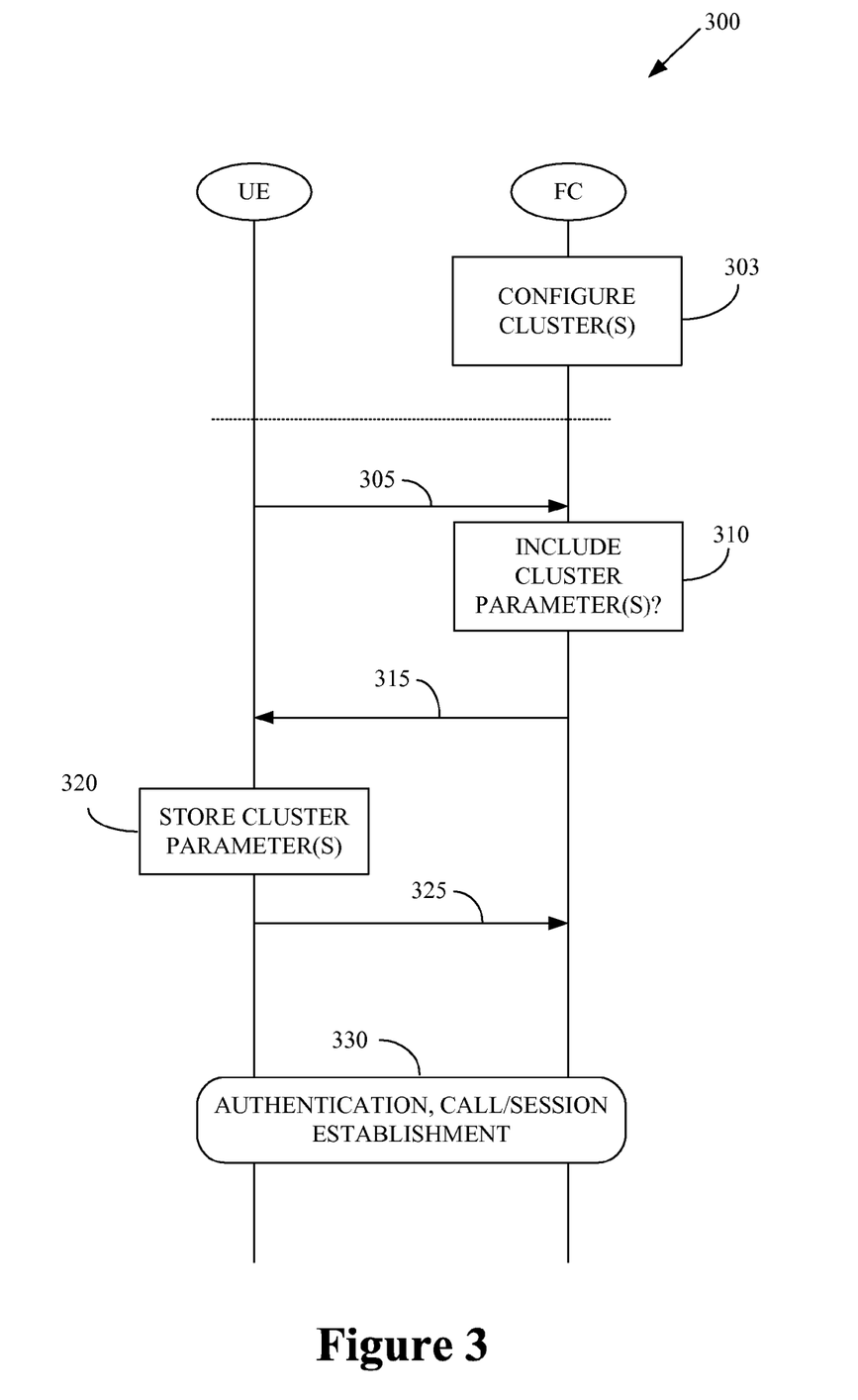
FIG. 3 conceptually illustrates one exemplary embodiment of a method of associating user equipment with a femtocell cluster.

FIG. 3 conceptually illustrates one exemplary embodiment of a method 300 of associating user equipment (UE) with a femtocell cluster (FC). In the illustrated embodiment, the clusters are configured (at 303) during a configuration interval that occurs prior to associating any user equipment with the femtocells in the femtocell clusters. Configuration (at 303) includes storing information in each of the femtocells in the cluster that indicates the identities of the other femtocells in the cluster and the location of the femtocells in the femtocell cluster. Other mobility-related information may be stored in the cluster femtocells during the configuration (at 303) of the cluster.

After the femtocells in the clusters have been configured, user equipment may initiate the association/configuration process by transmitting (at 305) a message to any one or more of the femtocells in the femtocell cluster. For example, the message may be a RRC connection request message that is transmitted (at 305) over an air interface. The femtocell that receives the message then determines (at 310) whether the user equipment can be associated with the femtocell cluster. For example, the femtocell may check the release version of user equipment and, if the release is known to support femtocell cluster functionality, the femtocell may determine that the user equipment supports femtocell cluster functionality. The femtocell may then transmit (at 315) a message including configuration information for the femtocell cluster. In the illustrated embodiment, the femtocell transmits (at 315) an RRC connection setup message that includes the Boolean variable FemtoClusterAvailable with a value of TRUE and information indicating the locations of the femtocells in the available cluster. The information may be included in multiple optional instances of the variable FemtoClusterCellLocation.

The user equipment can store (at 320) the femtocell cluster parameters transmitted by the femtocell. For example, the user equipment can store (at 320) the femtocell cluster parameters in a database that is constructed for this purpose. Completion of the connection setup process can then be indicated by transmitting (at 325) a message such as a RRC Connection Setup Complete message. At this point, a RRC connection has been established (at 330) and the user equipment and femtocell can proceed with any other steps that may be used to establish communication over the air interface. The steps may include, but are not limited to, authentication of the user equipment and/or the femtocell, call establishment, session establishment, and the like.

Figure 4:
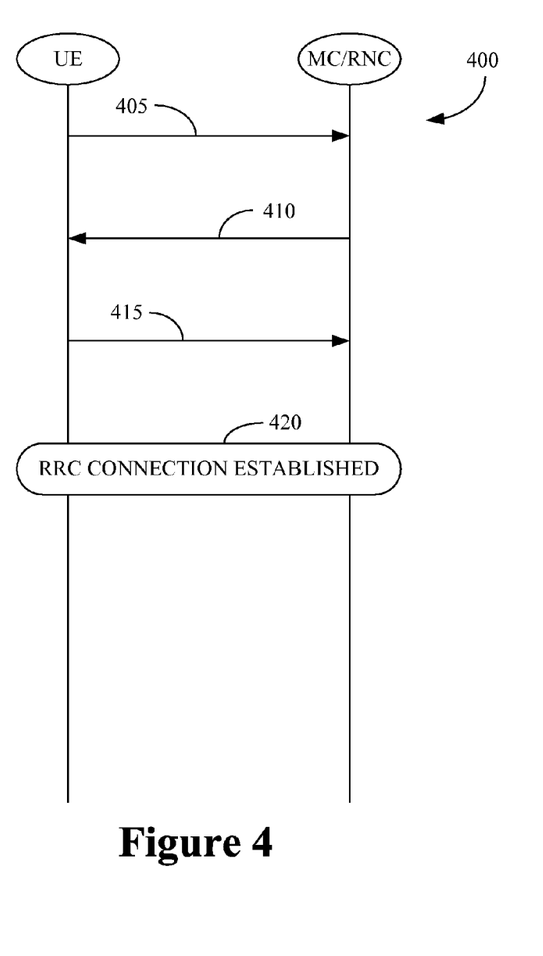
FIG. 4 conceptually illustrates one exemplary embodiment of a method of establishing communication between user equipment and a macro-cell when the user equipment is not associated with a femtocell cluster.

FIG. 4 conceptually illustrates one exemplary embodiment of a method 400 of establishing communication between user equipment and a macro-cell when the user equipment is not associated with a femtocell cluster. This embodiment may be implemented in the user equipment has a release version that does not support femtocells or femtocell clustering. In this case, the Boolean variable FemtoClusterAvailable is not defined or transmitted. Alternatively, the user equipment may have a release version that does support femtocells or femtocell clustering but may not have been associated with a femtocell cluster. In another case, the Boolean variable FemtoClusterAvailable is defined and set equal to FALSE. The user equipment may transmit (at 405) a connection request to the macro-cell and/or the radio network controller (MC/RNC). The macro-cell responds (at 410) with a connection set up message. The user equipment may then perform conventional set up procedures and transmit (at 415) a connection setup complete message. At this point, an RRC connection has been established (at 420). Since the user equipment is not associated with a femtocell cluster, the messages 405, 410, 415 do not include any variables or parameters associated with a femtocell cluster.

Figure 5:
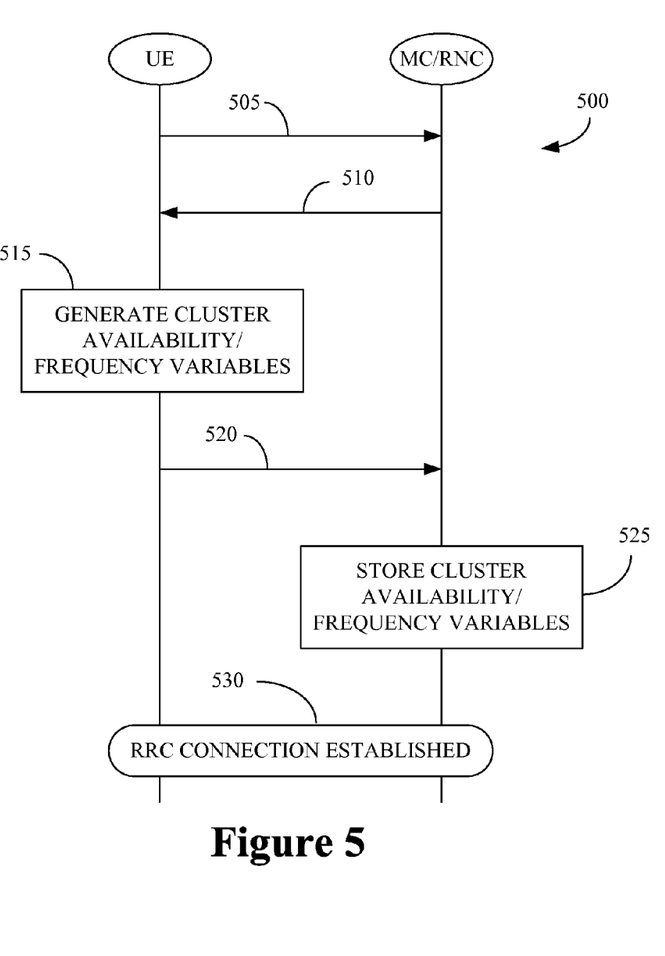
FIG. 5 conceptually illustrates one exemplary embodiment of a method of establishing communication between user equipment and a macro-cell when the user equipment is associated with a femtocell cluster.

FIG. 5 conceptually illustrates one exemplary embodiment of a method 500 of establishing communication between user equipment and a macro-cell when the user equipment is associated with a femtocell cluster. In this case, the Boolean variable FemtoClusterAvailable is defined and set to TRUE. The method 500 begins when the user equipment transmits (at 505) a connection request to the macrocell and the macrocell replies by transmitting (at 510) a connection setup request. Since the user equipment is associated with a femtocell cluster, the user equipment generates (at 515) availability and/or frequency variables such as FemtoClusterAvailable and FemtoClusterCellFrequency. The user equipment may then transmit (at 520) a connection setup complete message that includes the Boolean variable FemtoClusterAvailable with a value of TRUE. The connection setup complete message may also include information indicating the frequency (or frequencies) used by the femtocells in the cluster. Upon reception of the connection setup complete message, the radio network controller stores (at 525) the femtocell cluster information and/or mobility information, e.g. in a context associated with the user equipment. The RRC connection is now established (at 530).

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method for implementation in user equipment that is configured to communicate with a wireless communication system that comprises at least one macro-cell and a plurality of femtocells that are grouped in a femtocell cluster, the method comprising:
providing a call connection request from said user equipment to one of the plurality of femtocells in the femtocell cluster;
receiving, at said user equipment from said one of the plurality of femtocells in response to providing the call connection request, identifiers of each femtocell in the femtocell cluster and locations of each femtocell in the femtocell cluster;
storing the identifiers of the femtocells in the femtocell cluster and the locations of the femtocells in the femtocell cluster in said user equipment; and
transmitting, from said user equipment, the identifiers of the femtocells in the femtocell cluster and the locations of the femtocells in the femtocell cluster.

2. The method of claim 1, comprising receiving a connection set up message including a Boolean value indicative of said one of the plurality of femtocells being a member of the femtocell cluster.

3. The method of claim 1, wherein receiving the identifiers of the femtocells in the femtocell cluster comprises receiving information supplied to the femtocells in the femtocell cluster by a service provider.

4. The method of claim 1, wherein storing the locations of the femtocells in the femtocell cluster comprises storing the locations of the femtocells in a data structure maintained in said user equipment.

5. The method of claim 4, comprising storing mobility-related cell information associated with the femtocell cluster in the data structure.

6. The method of claim 5, wherein storing mobility-related cell information comprises storing at least one of a scrambling code, an international mobile subscriber identity, and a U-RNTI.

7. The method of claim 1, comprising transmitting information indicating at least one frequency used by the femtocells in the femtocell cluster.

8. The method of claim 7, wherein transmitting said information indicating said at least one frequency comprises transmitting a connection set up message including at least one frequency variable comprising said information identifying said at least one frequency used by the femtocells in the femtocell cluster.

9. The method of claim 1, comprising transmitting a connection set up message comprising a Boolean value indicative of the identifiers and the locations of the femtocell cluster being available for storage.

10. The method of claim 1, wherein the identifiers and the locations of the femtocells in the femtocell cluster are received by a radio network controller, the radio network controller being configured to maintain the provided identifiers and locations in a context database.

11. A method for implementation in a first femtocell that is configured for deployment in a wireless communication system that comprises at least one macro-cell, the first femtocell being one of a plurality of femtocells deployed as a femtocell cluster in the wireless communication system, the method comprising:
- receiving, at the first femtocell, a call connection request from user equipment; and
- providing, from the first femtocell in response to the call connection request, identifiers of each femtocell in the femtocell cluster, and locations of each of the femtocells in the femtocell cluster, wherein the identifiers and locations of each femtocell in the femtocell cluster are stored in the first femtocell prior to receiving the call connection request from said user equipment.

12. The method of claim 11, comprising providing a connection set up message including a Boolean value indicative of the first femtocell being one of a subset of femtocells associated with said user equipment, wherein the Boolean value also indicates availability of the provided identifiers and locations for storage by the user equipment.

13. The method of claim 11, comprising receiving, from a service provider, the identifiers of the femtocells in the femtocell cluster and the locations of each of the femtocells in the femtocell cluster, and storing the identifiers and the locations in the first femtocell.

14. The method of claim 11, comprising determining whether said user equipment supports femtocell functionality and providing the identifiers of the femtocells in the femtocell cluster in response to determining that said user equipment supports femtocell functionality.

15. The method of claim 11, comprising establishing a call connection between the first femtocell and said user equipment after providing the identifiers of the femtocells in the femtocell cluster and the locations of each of the femtocells in the femtocell cluster.

16. A method for implementation in a radio network controller configured for deployment in a wireless communication system that comprises at least one macro-cell and a plurality of femtocells, the method comprising:
- receiving, at the radio network controller, a call connection request from user equipment configured to communicate with a femtocell cluster formed of a subset of the plurality of femtocells;
- providing, from the radio network controller in response to the call connection request, a call connection set up message;
- receiving, at the radio network in response to the call connection set up message, information indicating the availability of the subset of femtocells in the femtocell cluster and at least one frequency used for transmission by the femtocells in the femtocell cluster; and
- storing, at the radio network controller in a context database, the indication of the availability of the subset of femtocells in the femtocell cluster and at least one frequency used for transmission by the femtocells in the femtocell cluster.

17. The method of claim 16, wherein receiving the information identifying the femtocell cluster comprises receiving a connection set up complete message including a Boolean value that is set to a value indicative of the availability of the femtocell cluster.

18. The method of claim 16, wherein storing the information indicating the availability of the subset of femtocells in the femtocell cluster and said at least one frequency comprises storing the information in a context associated with said user equipment.

19. The method of claim 16, comprising establishing a call connection between a macrocell and said user equipment.

* * * * *

UNITED STATES PATENT AND TRADEMARK OFFICE
CERTIFICATE OF CORRECTION

| | | |
|---|---|---|
| PATENT NO. | : 8,718,652 B2 | |
| APPLICATION NO. | : 12/265173 | |
| DATED | : May 6, 2014 | |
| INVENTOR(S) | : Suat Eskicioglu et al. | |

It is certified that error appears in the above-identified patent and that said Letters Patent is hereby corrected as shown below:

In The Claims

Column 10, Line 61, please change "frequency variable comprising said information identifying said at least one frequency" to -- frequency variable comprising said information indicating said at least one frequency --

Column 10, Line 66, please change "the locations of the femtocell cluster being available for storage." to -- the locations of the femtocells in the femtocell cluster being available for storage. --

Signed and Sealed this
Thirtieth Day of June, 2015

Michelle K. Lee
*Director of the United States Patent and Trademark Office*